United States Patent [19]

Derouane et al.

[11] Patent Number: 4,891,197
[45] Date of Patent: Jan. 2, 1990

[54] SILICOPHOSPHOALUMINATES AND RELATED CRYSTALLINE OXIDES

[75] Inventors: Eric G. Derouane, Namur, Belgium; Roland von Ballmoos, Hopewell, N.J.

[73] Assignee: Mobil Oil Corporation, New York, N.Y.

[21] Appl. No.: 878,754

[22] Filed: Jun. 26, 1986

Related U.S. Application Data

[63] Continuation-in-part of Ser. No. 642,925, Aug. 21, 1984, abandoned, and a continuation-in-part of Ser. No. 685,186, Dec. 21, 1984, Pat. No. 4,623,527, which is a continuation-in-part of Ser. No. 562,909, Dec. 19, 1983, abandoned, said Ser. No. 642,925, is a continuation-in-part of Ser. No. 562,673, Dec. 19, 1983, abandoned, and a continuation-in-part of Ser. No. 615,391, May 25, 1984.

[51] Int. Cl.$^4$ .................. C01B 33/12; C01B 33/20; C01B 33/28; C01B 25/36
[52] U.S. Cl. .................. 423/279; 423/600; 423/594; 423/595; 423/601; 423/624; 423/617; 423/618; 423/608; 423/610; 423/306; 423/326
[58] Field of Search ............ 423/326, 328, 329, 330, 423/331, 332, 600, 594, 595, 601, 624, 617, 618, 608, 610, 306, 279; 502/60, 62, 208, 213, 214

[56] References Cited

U.S. PATENT DOCUMENTS

| | | | |
|---|---|---|---|
| 2,428,741 | 10/1947 | Plank | 502/203 |
| 3,697,550 | 10/1972 | Bayne et al. | 260/346 |
| 3,702,886 | 11/1972 | Argauer et al. | 423/328 |
| 3,801,704 | 4/1974 | Kobayashi et al. | 423/309 |
| 3,904,550 | 9/1975 | Pine | 252/437 |
| 4,014,945 | 3/1977 | Zimmerschied et al. | 260/635 |
| 4,071,471 | 1/1978 | Banks et al. | 252/437 |
| 4,078,042 | 3/1978 | Leach | 423/329 |
| 4,158,621 | 6/1979 | Swift et al. | 208/114 |
| 4,179,358 | 12/1979 | Swift et al. | 208/114 |
| 4,208,305 | 6/1980 | Kouwenhoven et al. | 423/326 X |
| 4,210,560 | 7/1980 | Kehl | 252/437 |
| 4,222,896 | 9/1980 | Swift et al. | 252/437 |
| 4,228,036 | 10/1980 | Swift et al. | 252/437 |
| 4,310,440 | 1/1982 | Wilson et al. | 252/435 |
| 4,361,705 | 11/1982 | Marcelin et al. | 568/462 |
| 4,365,095 | 12/1982 | Marcelin et al. | 568/462 |
| 4,385,994 | 5/1983 | Wilson et al. | 210/689 |
| 4,397,825 | 8/1983 | Whittam | 423/328 X |
| 4,440,871 | 4/1984 | Lok et al. | 502/214 |
| 4,500,651 | 2/1985 | Lok et al. | 502/208 |
| 4,567,030 | 1/1986 | Yuasa et al. | 423/326 |
| 4,623,527 | 11/1986 | Derouane et al. | 423/306 |

FOREIGN PATENT DOCUMENTS

| | | |
|---|---|---|
| 0043562 | 1/1982 | European Pat. Off. |
| 0103117 | 3/1984 | European Pat. Off. |
| 0121232 | 3/1984 | European Pat. Off. |
| 146384A | 6/1985 | European Pat. Off. |
| 0131946 | 7/1985 | European Pat. Off. |
| 0158976 | 10/1985 | European Pat. Off. |
| 1364555 | 5/1964 | France |
| 1412923 | 8/1965 | France |
| 1527972 | 4/1968 | France |
| 2053283 | 4/1971 | France |
| 2059319 | 5/1971 | France |
| 2099946 | 3/1972 | France |

OTHER PUBLICATIONS

Lok et al., "Zeolites", 1983, vol. 3, Oct. pp. 282–291.
Haggin, C&EN, Jun. 20, 1983, pp. 36 and 37.
Chemical Abstracts, vol. 102 (1985) Apr., No. 16, p. 137.
Chemical Abstracts, vol. 75, 6 Sep. 1971, p. 323, #68585y.

*Primary Examiner*—John Doll
*Assistant Examiner*—R. Bruce Breneman
*Attorney, Agent, or Firm*—Alexander J. McKillop; Michael G. Gilman; Dennis P. Santini

[57] ABSTRACT

A method for synthesizing a crystalline silicophosphoaluminate is provided. The composition has ion-exchange properties and is readily convertible to catalytically active material. The synthesis method requires an organic phase, and an aqueous phase. The silicon, phosphorus and aluminum components of the silicophosphoaluminate may, optionally, be replaced with other elements in the plus 4, 5 and 3 valence states, respectively.

6 Claims, No Drawings

SILICOPHOSPHOALUMINATES AND RELATED CRYSTALLINE OXIDES

CROSS-REFERENCE TO RELATED APPLICATION

This application is a continuation-in-part of copending U.S. application Ser. No. 642,925, filed Aug. 21, 1984, abandoned, which is, in turn, a continuation-in-part of U.S. application Ser. No. 562,673, filed Dec. 19, 1983, abandoned. This 642,925 application is also a continuation-in-part of U.S. application Ser. No. 615,391 filed May 25, 1984, abandoned. This application is also a continuation-in-part of U.S. application Ser. No. 685,186, filed Dec. 21, 1984, now U.S. Pat. No. 4,623,527. This Ser. No. 685,186 is, in turn, a continuation-in-part of U.S. application Ser. No. 562,909, filed Dec. 19, 1983, now abandoned.

This application is also related to European patent application Ser. No. 84308812.1, filed Dec. 17, 1984, now Published European patent application Ser. No. 147,991. The entire disclosures of the above-mentioned U.S. and European patent applications are expressly incorporated herein by reference.

BACKGROUND

A synthetic crystalline silicophosphoaluminate may be synthesized from a reaction medium consisting of two liquid phases and comprising an organic or inorganic directing agent and specific reactants. This synthesis results in a silicophosphoaluminate crystalline framework having ion-exchange properties and being readily convertible to catalytically active material. The silicon, phosphorus and aluminum components of these materials may be replaced by other elements.

Aluminum phosphates are taught in U.S. Pat. Nos. 4,310,440 and 4,385,994, for example. Aluminum phosphate materials have electroneutral lattices and, therefore, are not useful as ion-exchangers or as catalyst components. Microporous aluminum phosphates have a composition typified as:

$$xR:Al_2O_3:(1.0\pm0.2)P_2O_5:yH_2O$$

wherein R is an organic amine or quaternary ammonium salt entrapped within the aluminum phosphate and playing a role as crystallization template, x and y representing the amounts of R and $H_2O$ needed to fill the microporous voids. Because of the aluminum/phosphorus atomic ratio of these materials being about unity, they display virtually no ion-exchange properties, the framework positive charge on phosphorus being balanced by corresponding negative charge on aluminum:

$$AlPO_4 = (AlO_2^-)(PO_2^+).$$

The phosphorus-substituted zeolites of Canadian Pat. Nos. 911,416; 911,417 and 911,418 are referred to as "aluminosilicophosphate" zeolites. Some of the phosphorus therein appears to be occluded, not structural. These latter materials containing silicon, aluminum and phosphorus are characterized by the general formula:

$$M_{(x-y)}:x(AlO_2^-):(SiO_2):y(PO_2^+):zH_2O$$

wherein M is a monovalent cation, x is approximately 0.125–1.5, y is 0.05–1.0 and z is the number of hydration water molecules. Structural replacement of silicon with phosphorus has been realized in materials called silica clathrates (West Germany Pat. No. 3,128,988).

U.S. Pat. No. 4,363,748 describes a combination of silica and aluminum-calcium-cerium phosphate as a low acid activity catalyst for oxidative dehydrogenation. Great Britain Pat. 2,068,253 discloses a combination of silica and aluminum-calcium-tungsten phosphate as a low acid activity catalyst for oxidative dehydrogenation. U.S. Pat. No. 3,801,704 teaches an aluminum phosphate treated in a certain way to impart acidity. U.S. Pat. No. 4,228,036 teaches an alumina-aluminum phosphate-silica matrix as an amorphous body to be mixed with zeolite for use as cracking catalyst. U.S. Pat. No. 3,213,035 teaches improving hardness of aluminosilicate catalysts by treatment with phosphoric acid. The catalysts are amorphous.

U.S. Pat. No. 2,876,266 describes an active silicophosphoric acid or salt phase of an amorphous material prepared by absorption of phosphoric acid by premolded silicates or aluminosilicates.

Other teachings of aluminum phosphates and their preparation include U.S. Pat. Nos. 4,365,095; 4,361,705; 4,222,896; 4,210,560; 4,179,358; 4,158,621; 4,071,471; 4,014,945; 3,904,550 and 3,697,550. Since their neutral framework structure is void of ion-exchange properties, they are used as catalyst supports or matrices.

U.S. Pat. No. 4,440,871 describes various crystalline microporous materials characterized as "silicoaluminophosphates". These materials are prepared hydrothermally from aqueous gels containing reactive phosphorus, silicon and aluminum compounds and organic templating agents.

The crystalline silicophosphoaluminates synthesized hereby are molecular sieve or other framework structures exhibiting ion-exchange properties and are easily and conveniently converted to materials having intrinsic catalytic activity. Techniques for synthesis of zeolites or aluminum phosphates taught in the art are not felt to be useful for synthesis of these crystalline silicophosphoaluminates.

Summary

A method is provided for synthesis of crystalline silicophosphoaluminates, some of which have microporosity and catalytic activity, all of which exhibit ion-exchange properties and the ready ability for conversion to material having catalytic activity. The method comprises first preparing a reaction mixture composed of two liquid phases, an organic phase and an aqueous phase. The organic phase comprises an organic solvent, more particularly a substantially water immiscible organic solvent So, such as a $C_5$–$C_{10}$ alcohol, as a non-limiting example, and a silicon source, such as an alkoxy-silicate, as a non-limiting example, soluble in said solvent. An organic directing agent D may be selected from the group consisting of organic mono-, di- or polyamines and onium compounds having the following formulas:

$$R_4M^+X^- \text{ or } (R_3M^+R'M^+R_3)X_2^-$$

wherein R or R' is alkyl of from 1 to 20 carbon atoms, heteroalkyl of from 1 to 20 carbon atoms, aryl, heteroaryl, cycloalkyl of from 3 to 6 carbon atoms, cycloheteroalkyl of from 3 to 6 carbon atoms, or combinations thereof; M is a tetracoordinate element (e.g. nitrogen, phosphorus, arsenic, antimony or bismuth) or a heteroatom (e.g. N, O, S, Se, P, As, etc.) in an alicyclic, heteroalicyclic or heteroaromatic structure; and X is an anion (e.g. fluoride, chloride, bromide, iodide, hydroxide, acetate, sulfate, carboxylate, etc.). When M is a heteroatom in an alicyclic, heteroalicyclic or heteroaromatic structure, such structure may be, as non-limiting examples,

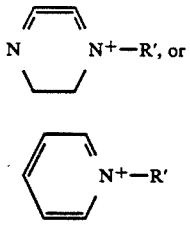

wherein R' is alkyl of from 1 to 20 carbon atoms, heteroalkyl of from 1 to 20 carbon atoms, aryl, heteroaryl, cycloalkyl of from 3 to 6 carbon atoms or cycloheteroalkyl of from 3 to 6 carbon atoms.

Particularly preferred directing agents for the present method include alkylamines wherein alkyl is of 1 to 3 carbon atoms and onium compounds, above defined, wherein R is alkyl of 1 to 4 carbon atoms, R' is alkyl of 1 to 6 carbon atoms, M is nitrogen and X is halide or hydroxide. Non-limiting examples of these include di-n-propylamine, tetrapropylammonium hydroxide, tetraethylammonium hydroxide, tetrapropylammonium bromide, and hexamethyl-hexane diammonium hydroxide or bromide. An inorganic hydroxide or salt of suitable composition can also be used as directing agent; non-limiting examples of which are KOH, NaOH, CsOH, CsBr, NaCl, Ca(OH)$_2$, and the like.

The aqueous phase may comprise, e.g., the aluminum and phosphorus components of synthesis mixture. These components may be incorporated into the aqueous phase by dissolving or partially dissolving a preformed solid crystalline aluminum phosphate material in the aqueous phase. This dissolution is accomplished by maintaining the aqueous phase at a sufficiently alkaline pH, e.g., by incorporating therein a sufficient amount of a basic material. Optionally, additional sources of aluminum and/or phosphorus, e.g., Al$_2$O$_3$ and/or H$_3$PO$_4$, may also be incorporated into the aqueous phase.

The present method then comprises maintaining the reaction mixture under sufficient conditions of temperature, pH and heating rate to synthesize the desired silicophosphoaluminate. The reaction mixture may be heated at a rate of from about 5° C. to about 200° C. per hour up to a temperature of from about 80° C. to about 300° C. and maintained there for from about 2 hours to about 500 hours until crystals of silicophosphoaluminate are formed. The pH of the reaction mixture may be maintained at less than about 9 during the heating and crystallization period. This may be accomplished by adjusting the concentration of added base(s).

After crystals of the desired silicophosphoaluminate are formed, they may be separated from the reaction mixture by filtration, and then washed with water and dried, such as by heating.

The silicophosphoaluminate may have a composition in which the number of atoms of aluminum and phosphorus is greater than the number of atoms of silicon, i.e. Al+P Si. It is named "silicophosphoaluminate" in view of its crystalline composition and of the charge distribution on its framework tetrahedral T-sites. As synthesized, its characteristic composition, in the anhydrous state, may be as follows:

$$A_v \cdot M_{x/m}{}^{m+} \cdot (AlO_2)_{1-y}{}^{-} \cdot (PO_2)_{1-x}{}^{+} \cdot (SiO_2)_{x+y} \cdot N_{y/n}{}^{n-}$$

wherein v is moles of A, occluded organic material resulting from organic directing agent and/or solvent used in synthesis of and filling microporous voids of the silicophosphoaluminate, which material may be removed upon calcination; M is a cation of valence m; N is an anion of valence n; and x and y are numbers of from greater than $-1$ to less than $+1$ which satisfy the relationships:

(1) if x is 0, then y is not 0,
(2) if y is 0, then x is not 0,
(3) if the atomic ratio of Al/P is greater than 1, then (x+y) is greater than 0, e.g. 0.001, and y+0.6x is less than 0.4, and
(4) if the atomic ratio of Al/P is less than 1, then (x+y) is greater than 0, e.g. 0.001, and 0.5 is greater than 0.5y+x.

In the above composition, when x is greater than y, the silicophosphoaluminate is a cation exchanger with potential use as an acidic catalyst. When x is less than y, the silicophosphoaluminate is an anion exchanger with potential use as a basic catalyst. In any event, the silicophosphoaluminate will exhibit an ion exchange capacity of at least about 0.002 meq/g.

The composition of the silicophophoaluminate in the anhydrous state with organic material removed, and with M, m, N, n, x and y as above-defined, may be as follows:

$$M_{x/m}{}^{m+} \cdot (AlO_2)_{1-y}{}^{-} \cdot (PO_2)_{1-x}{}^{+} \cdot (SiO_2)_{x+y} \cdot N_{y/n}{}^{n-}.$$

It will be understood that the silicon, phosphorus and aluminum portions of the reactants discussed hereinabove may be replaced in whole or in part, with functionally equivalent elements. For example, in the field of crystalline aluminosilicate zeolites it has been found that the silicon portion thereof may be replaced with, e.g., germanium, and the aluminum portion thereof may be replaced with iron, chromium, vanadium, molybdenum, arsenic, antimony, manganese, gallium or boron.

Therefore, in accordance with broader aspects of the present invention, there is provided a crystalline oxide having a composition, in the anhydrous state, as follows:

$$M_{x/m}{}^{m+} \cdot (XO_2)_{1-y}{}^{-} \cdot (YO_2)_{1-x}{}^{+} \cdot (ZO_2)_{x+y} \cdot N_{y/n}{}^{n-}$$

wherein X represents one or more elements of valence plus 3, Y represents one or more elements of valence plus 5, Z represents one or more elements of valence plus 4, the number of atoms represented by Z is less than the sum of the number of atoms represented by X and Y, M is a cation of valence m, N is an anion of valence n, and x and y are numbers of from greater than $-1$ to less than $+1$ which satisfy the relationships:

(1) if x is 0, then y is not 0,
(2) if y is 0, then x is not 0,
(3) if the atomic ratio of X/Y is greater than 1, then (x+y) is greater than 0 and y+0.6x is less than 0.4, and
(4) if the atomic ratio of X/Y is less than 1, then (x+y) is greater than 0 and 0.5 is greater than 0.5y+x, said crystalline oxide having an ion exchange capacity of at least about 0.002 meq/g.

In accordance with a broader synthesis aspect of the invention, there is provided a method for synthesis of crystalline oxides which comprises preparing a reaction mixture comprising a liquid organic phase and a liquid aqueous phase, said reaction mixture comprising components in the following relationship:

$$(A)_a:(M_2O)_b:(X_2O_3)_c:(ZO_2)_d:(Y_2O_5)_e:$$
$$(Solvent)_f:(anion\ source)_g:(H_2O)_h$$

wherein M, X; Y and Z are depicted in the form of oxides thereof and a, b, c, d, e, f, g, and h are numbers satisfying the following relationships:
a/(c+d+e) is less than 4,
b/(c+d+e) is less than 2,
d/(c+e) is less than 2,
f/(c+d+e) is from 0 to 15,
g/(c+d+e) is less than 2, and
h/)c+d+e) is from 3 to 150,
heating said reaction mixture at a rate of from about 5° C. to about 200° C. per hour to a temperature of from about 80° C. to about 300° C., maintaining said reaction mixture at a temperature of from about 80° C. to about 300° C. and a pH of from about 2 to about 9, and recovering said crystalline oxide.

EMBODIMENTS

The synthetic crystalline silicophosphoaluminates and other oxides prepared by the present method are effective cationic ion-exchangers and acid catalysts when the X/Y (e.g. Al/P) ratio is greater than unity. Such catalysts have an acid strength spectrum differing from that of zeolites, which can be beneficial in some catalytic processes. For X/Y ratios lower than unity, anionic exchange properties prevail and render such materials active for base-catalyzed reactions. They also offer a new class of catalyst supports and are particularly interesting in this respect because of their high ion-exchange capacity which should enable the retention of rather high metal loadings. They will show in the latter case the same catalytic flexibility as other supported metal or metal oxide(s) catalysts. Sorption properties indicate that microporous silicophosphoaluminates are molecular shape selective and this can be advantageous in numerous catalytic processes as known in the art of zeolite catalysis.

If synthesized with an X/Y (e.g., aluminum/phosphorus) atomic ratio of greater than one, the crystalline oxide (e.g., silicophosphoaluminate) may exhibit an X/Z (e.g., aluminum/silicon) atomic ratio of greater than 1.5, and usually in the range of from 1.6 to 600. When the X/Y (e.g., aluminum/phosphorus) ratio is of less than one, it may exhibit a Y/Z (e.g., phosphorus/silicon) atomic ratio of greater than unity, usually within the range of from 1.2 to 600.

It is well recognized that aluminum phosphates exhibit a phosphorus/aluminum atomic ratio of essentially unity, and essentially no silicon.

Also, the phosphorus-substituted zeolite compositions, sometimes referred to as "aluminosilicophosphate" zeolites, have a silicon/aluminum atomic ratio of usually greater than unity, generally from 0.66 to 8.0, and a phosphorus/aluminum atomic ratio of less than unity, usually from greater than 0 to 1.

The use of a two-phase synthesis reaction mixture system, exclusive of the solids, enables one to maintain in solution in the organic phase one or more of the reactants which are normally insoluble or unstable in the aqueous phase under the present synthesis conditions. Such a procedure enables the preparation of e.g., silicophosphoaluminates, the synthesis of which is believed to be particularly unsuccessful using other techniques. Further, microporous properties can be achieved for the crystalline silicophosphoaluminates by performing inorganic syntheses in the presence of organic or inorganic directing agents. In addition to its templating role, the organic directing agent can also act as a surfactant. It can help the codispersion of the organic and aqueous phases containing the reagents.

In the synthesis method of the present invention, the reaction mixture will contain sufficient sources of Z (e.g., silicon), Y (e.g., phosphorus) and X (e.g., aluminum), directing agent(s) and an organic solvent, above-defined.

The overall molar composition of the two-phase synthesis mixture, in terms of oxides and organic components, may be:

$$(A)_a:(M_2O)_b:(X_2O_3)_c:(ZO_2)_d:(Y_2O_5)_e:$$
$$(Solvent)_f:(anion\ source)_g:(H_2O)_h$$

where: a/(c+d+e) is less than 4, b/(c+d+e) is less than 2, d/(c+e) is less than 2, f/(c+d+e) is from 0 to 15, e.g., from 0.1 to 15, g/(c+d+e) is less than 2 and h/(c+d+e) is from 3 to 150. The "Solvent" is an organic solvent and "A" is any organic compound or material such as that derived from an organic directing agent or organic solvent. The anion is not necessarily separately added to the two-phase system, but may or may not appear in the product crystals from one or more of the other component sources.

Examples of atoms represented by X include aluminum, iron chromium, vanadium, molybdenum, arsenic, antimony, manganese, gallium and boron, each in the plus 3 valence state. Examples of atoms represented by Y include phosphorus, arsenic, antimony and vanadium, each in the plus 5 valence state. Examples of atoms represented by Z include silicon, germanium and titanium each in the plus 4 valence state.

The reaction mixture may be heated carefully at a rate of from about 5° C. to about 200° C. per hour up to a temperature of from about 80° C. to about 300° C. and maintained within that temperature range until crystals of desired oxide (e.g., silicophosphoaluminate) form, usually from about 5 hours to about 500 hours. The pH of the reaction mixture during crystallization may be carefully maintained at less than about 9, e.g., from about 6 to about 8. This may be accomplished by adjusting the concentration of basic material, organic and/or inorganic.

Following crystallization of the desired oxide (e.g., silicophosphoaluminate), the reaction mixture containing same may be filtered and the recovered crystals may be washed, for example with water, and then dried, such as by heating at from about 25° C. to about 150° C. at atmospheric pressure.

In accordance with the method of the present invention, a source of aluminum and phosphorus in the synthesis mixture may be dissolved or partially dissolved aluminum phosphate. Such aluminum phosphate may be supplied in the form of an amorphous material, a crystalline material or mixtures thereof. Crystalline aluminum phosphates may have dense or open-pore type structures. Examples of the latter type of crystalline aluminum phosphates are described in U.S. Pat. Nos. 4,310,440 and 4,385,994.

Examples of basic materials which may be incorporated into the aqueous phase include hydroxides of Group I metals of the Periodic Table as well as alkali metal carbonates, silicates, and hydroxides of tetraalkylammonium ions.

Additional sources of aluminum include, as non-limiting examples, any known form of aluminum oxide or hydroxide, organic or inorganic salt or compound.

Additional sources of phosphorus include, as non-limiting examples, any known form of phosphorus acids or phosphorus oxides, phosphates and phosphites, and organic derivatives of phosphorus.

Useful sources of silicon include, as non-limiting examples, any known form of silicic acid or silicon dioxide, alkoxy- or other compounds of silicon.

The organic compounds of the organic phase may act as solvent and may be, for example, one or more compounds selected from the group consisting of alcohols, e.g. organic hydroxy compounds including alkanols of from 5 to about 10 carbon atoms, phenols, and naphthols; and other water immiscible organic solvents. Polar organic compounds are preferred for the organic phase.

In a more specific illustration of a particular synthesis method in accordance with the present invention, the aqueous phase contains the phosphorus and aluminum components. The organic phase with hexanol as solvent contains the silicon source, e.g. tetra-orthoalkyl-silicate. The organic directing agent, e.g. tetraalkylammonium hydroxide or an amine, also acts as a surfactant to emulsify the aqueous and organic phases and optimize the interface. Silicon is progressively supplied during synthesis to the gel by hydrolysis of its organic compound and transfer of the product through the interface into the aqueous phase.

As Z (e.g., silicon), X (e.g., aluminum) and Y (e.g., phosphorus) must be available simultaneously to nucleate and crystallize the desired oxide (e.g., silicophosphoaluminate), the rates of supply of all three elements have to be comparable. This implies that when an aluminum phosphate is used as a source of aluminum and phosphorus, the dissolution of the aluminum phosphate and the hydrolysis of the organic silicon compound should be concerted. Therefore, it may be important to predissolve at least a portion of the aluminum phosphate. Even more critical will be the silicon supply rate which is dependent on factors such as the magnitude of the interface, temperature, pH of the aqueous phase, concentration, and nature of the organic solvent and of the silicon reagent.

Because the hydrolysis and transfer rates of alkoxy compounds of Z (e.g., alkoxy compounds of silicon) are controlled by the magnitude of the interface, as discussed earlier, Z (e.g., silicon) incorporation is expected to be favored as mixing increases.

As mentioned earlier, pH is an important synthesis variable. As the formation of the oxide (e.g., silicophosphoaluminate) proceeds, pH values of around or above neutral (i.e. about 6 or more, up to a maximum of about 9) should be maintained. As the base stability of silicophosphoaluminates is expected to be intermediate between those of aluminum phosphates and zeolites, pH values of about or slightly above 8 are preferred. Because of the major role played by the hydrolysis of the silicon reagent and the necessity to control it in the present method, there is a need to have a nearly constant pH during crystallization. This can be achieved by predissolving the aluminum phosphate before addition of the other reagents.

To achieve and maintain higher pH values (pH=8 or above), even after partial decomposition of the organic hydroxide, inorganic bases may be added. These inorganic bases can also play a role as directing agents.

By means of the synthesis aspect of the present invention, it is possible to prepare oxides by having from about 1 to about 20 percent, in terms of mole fraction, of Z (e.g., Si), from about 35 to about 50 percent, in terms of mole fraction of X (e.g., Al) and from about 35 to about 50 percent, in terms of mole fraction of Y (e.g., P). Accordingly, by means of the synthesis aspect of the present invention, it is possible to make oxides having empirical formulae not accounted for in pentagonal compositional areas in FIGS. 1 and 2 of the Lok et al. U.S. Pat. No. 4,440,871. More particularly in this regard, X (e.g., Al) may be present in a mole fraction of from 30 to 44 percent, Y (e.g., P) may be present in a mole fraction of from 43 to 50 percent and Z (e.g., Si) may be present in a mole fraction of from 6 to 20 percent, wherein obviously, the sum of the mole fractions of X, Y and Z is 100.

Microporous, crystalline oxide (e.g., silicophosphoaluminate) materials of the present invention have substantial ion exchange capacity and catalytic activity. To the contrary, corresponding materials of the same crystalline structure containing only aluminum, phosphorus and oxygen and essentially no silicon in the lattice structures thereof have little or no ion exchange capacity and catalytic activity. Accordingly, for example, the Alpha Value of a silicophosphoaluminate material may be at least 100 percent or even at least 1000 percent greater than the Alpha Value of a corresponding material of the same crystalline structure, said corresponding material having only aluminum, phosphorus and oxygen and essentially no silicon in the lattice structure thereof. Examples of such corresponding materials are generally referred to in the Wilson et al U.S. Pat. No. 4,310,440.

The oxides (e.g., silicophosphoaluminates) prepared hereby may be molecular sieves or other framework structures. When they are molecular sieves or dense materials, they will possess definite distinguishing crystalline structures which exhibit characteristic X-ray powder diffraction patterns.

When X-ray values are determined herein for the oxides (e.g., silicophosphoaluminates) of the present invention, whether molecular sieve or other structures, the radiation is the K-alpha doublet of copper and a diffractometer equipped with a scintillation counter and an associated computer is used. The peak heights, I, and the positions as a function of 2 theta, where theta is the Bragg angle, are determined using algorithms on the computer associated with the spectrometer. From these, the relative intensities, 100 $I/I_o$, where $I_o$ is the intensity of the strongest line or peak, and d (obs.) the interplanar spacing in Angstroms (A), corresponding to the recorded lines, are determined. The relative intensities are given in terms of the strongest line being taken as 100. The various cationic forms of particular oxides (e.g., silicophosphoaluminates) reveal substantially the same pattern with some shifts in interplanar spacing and variation in relative intensity. Other variations can occur, depending on the Z (e.g., silicon) to X (e.g., aluminum) and Y (e.g., phosphorus) to X (e.g., aluminum)

ratios of the particular sample, as well as its degree of thermal treatment.

The oxides of the present invention (e.g., silicophosphoaluminates) are microporous or dense materials with a framework containing tetrahedrally coordinated (by oxygen) Z (e.g., Si), Y (e.g., P) and X (e.g., Al) atoms. If microporous, they show ion-exchange, acidic, and catalytic properties which resemble those of zeolites. Because of their different acid strength spectrum, however, they are potentially interesting as catalysts for acid-catalyzed conversions in which too high or too low an acidity may result in unwanted secondary reactions. Acidity associated with framework X (e.g., Al) is brought in by replacement of Y (e.g., phosphorus) with Z (e.g., silicon). Alternately, basicity associated with framework Y (e.g., P) occurs when framework X (e.g., aluminum) is replaced by Z (e.g., silicon).

The ionic radii of X, Y and Z should be sufficient to permit the formation of the proper framework structure containing tetrahedral coordination. More particularly, it is felt that the ionic "Radius Ratio" of these elements should be in the range of from about 0.15 to about 0.73.

The term "Radius Ratio" is defined as the ratio of the crystal ionic radius of the element M to the crystal ionic radius of the oxygen anion, $O^{-2}$.

$$\text{Radius Ratio} = \frac{\text{crystal ionic radius of the element M}}{\text{crystal ionic radius of } O^{-2}}$$

The crystal ionic radii of elements are listed in the *CRC Handbook of Chemistry and Physics*, 61st Edition, CRC Press, Inc., 1980, pages F-216 and F-217, said listing incorporated herein by reference. In determining the Radius Ratio, it is necessary to use crystal ionic radii of the M atom and oxygen anion ($O^{-2}$) which have been measured by the same method.

Examples of "Radius Ratios" for various elements in various valence states are as follows:

| Element | Valence | Radius Ratio |
|---------|---------|--------------|
| As | +3 | 0.44 |
| B | +3 | 0.17 |
| Bi | +3 | 0.73 |
| Co | +2 | 0.55 |
| Cu | +2 | 0.54 |
| Fe | +3 | 0.56 |
| Fe | +3 | 0.48 |
| Ge | +2 | 0.55 |
| Ge | +4 | 0.40 |
| Mn | +2 | 0.61 |
| Sb | +3 | 0.57 |
| Ti | +3 | 0.58 |
| Ti | +4 | 0.52 |
| V | +3 | 0.56 |
| V | +4 | 0.48 |
| Zn | +2 | 0.56 |
| V | +5 | 0.45 |
| B | +1 | 0.26 |
| Ba | +1 | 1.16 |
| Ba | +2 | 1.02 |
| Ce | +3 | 0.78 |
| Cd | +1 | 0.86 |
| Cd | +2 | 0.73 |
| Cr | +1 | 0.61 |
| Cr | + | 0.67 |
| Cu | +1 | 0.73 |
| La | +1 | 1.05 |
| Mg | +1 | 0.62 |
| Mg | +2 | 0.50 |
| Mo | +1 | 0.70 |
| Sn | +2 | 0.70 |
| Sr | +2 | 0.85 |
| Th | +4 | 0.77 |

-continued

| Element | Valence | Radius Ratio |
|---------|---------|--------------|
| Ti | +1 | 0.73 |
| Ti | +2 | 0.71 |
| Zn | +1 | 0.67 |

Examples of particular types of silicophosphoaluminates are designated as follows: MCM-1 (U.S. application Ser. No. 562,677, filed Dec. 19, 1983); MCM-2 (U.S. application Ser. No. 562,778, filed Dec. 19, 1983); MCM-3 (U.S. application Ser. No. 562,661, filed Dec. 19, 1983); MCM-4 (U.S. application Ser. No. 562,621 filed Dec. 19, 1983); MCM-5 (U.S. application Ser. No. 562,908, filed Dec. 19, 1983); MCM-6 (U.S. application Ser. No. 562,777, filed Dec. 19, 1983); MCM-7 (U.S. application Ser. No. 562,776, filed Dec. 19, 1983); MCM-8 (U.S. application Ser. No. 562,769, filed Dec. 19, 1983); MCM-9 (U.S. application Ser. No. 562,775, filed Dec. 19, 1983); and MCM-10 (U.S. application Ser. No. 562,909, filed Dec. 19, 1983, now U.S. Pat. No. 4,623,527). The entire disclosures of the above mentioned applications, which describe the materials designated as MCM-1 to 10, are expressly incorporated herein by reference.

The oxides (e.g., silicophosphoaluminates) synthesized hereby can also be used as catalysts in intimate combination with a metal component such as silver, tungsten, vanadium, molybdenum, rhenium, chromium, manganese, or a Group VIII metal such as platinum or palladium where, for example, a hydrogenation-dehydrogenation or oxidation function is to be performed. Such a component can be ion-exchanged into the composition, impregnated therein or intimately physically admixed therewith. Such component can be impregnated in or onto it such as for example, by, in the case of platinum, treating the crystal with a solution containing a platinum metal-containing ion. Thus, suitable platinum compounds include chloroplatinic acid, platinum chlorides and various compounds containing the platinum amine complex.

The original ions, i.e. cations or anions, of the as synthesized oxides (e.g., silicophosphoaluminates) can be replaced in accordance with techniques well known in the art, at least in part, by ion exchange with other cations or anions. Preferred replacing cations include metal ions, hydrogen ions, hydrogen precursor, e.g. ammonium, ions and mixtures thereof. Particularly preferred cations include hydrogen, rare earth metals and metals of Groups IIA, IIIA, IVA, IB, IIB, IIIB, IVB, VIB and VIII of the Periodic Table of the Elements.

A typical ion exchange technique would be to contact the synthetic crystalline oxide (e.g., silicophosphoaluminate) with a salt of the desired replacing ion or ions. Examples of such salts of cations include the halides, e.g. chlorides, nitrates and sulfates.

The as synthesized oxides (e.g., silicophosphoaluminate) prepared in accordance herewith can be beneficially converted to another form by thermal treatment. This thermal treatment is generally performed by heating one of these forms at a termperature of at least 300° C. for at least 1 minute and generally not longer than 20 hours. While subatmospheric pressure can be employed for the thermal treatment, atmospheric pressure is desired for reasons of convenience. The thermal treatment can be performed at a temperature up to about 1000° C. The thermally treated product is particularly useful in the catalysis of certain hydrocarbon conversion reactions.

Further, the oxide (e.g., silicophosphoaluminate), when employed either as an adsorbent, ion-exchanger or as a catalyst in an organic compound conversion process should be dehydrated, at least partially. This can be done by heating to a temperature in the range of 200° C. to 600° C. in air or an inert atmosphere, such as nitrogen, etc. and at atmospheric, subatmospheric or superatmospheric pressures for between 30 minutes and 48 hours. Dehydration can also be performed at room temperature merely by placing the oxide (e.g., silicophosphoaluminate) in a vacuum, but a longer time is required to obtain a sufficient amount of dehydration. Therefore, depending upon the degree of dehydration or thermal treatment desired for the oxide (e.g., silicophosphoaluminate), it may be subjected to heating at a temperature of from about 200° C. to about 1000° C. for a time of from about 1 minute to about 48 hours.

The crystals of the oxide (e.g., silicophosphoaluminate) prepared by the instant invention can be shaped into a wide variety of particle sizes. Generally speaking, the particles can be in the form of a powder, a granule, or a molded product, such as an extrudate having a particle size sufficient to pass through a 2 mesh (Tyler) screen and be retained on a 400 mesh (Tyler) screen. In cases where the composition is molded, such as by extrusion, the crystals can be extruded before drying or partially dried and then extruded.

In the case of many catalysts, it is desired to incorporate the oxide (e.g., silicophosphoaluminate) with another material resistant to the temperatures and other condition employed in organic conversion processes. Such materials include active and inactive material and synthetic or naturally occurring zeolites as well as inorganic materials such as clays, silica and/or metal oxides. The latter may be either naturally occurring or in the form of gelatinous precipitates or gels including mixtures of silica and metal oxides. Use of a material in conjunction with the new oxide (e.g., silicophosphoaluminate), i.e. combined therewith, which is active, tends to improve the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials may be incorporated into naturally occurring clays, e.g. bentonite and kaolin, to improve the crush strength of the catalyst under commercial operating conditions. Said materials, i.e. clays, oxides, etc., function as binders for the catalyst. It is desirable to provide a catalyst having good crush strength because in commercial use it is desirable to prevent the catalyst from breaking down into powder-like materials. These clay binders have been employed normally only for the purpose of improving the crush strength of the catalyst.

Naturally occurring clays which can be composited with the new crystal include the montmorillonite and kaolin families which include the subbentonites, and the kaolins commonly known as Dixie, McNamee, Georgia and Florida clays or others in which the main mineral contituent is halloysite, kaolinite, dickite, nacrite, or anauxite. Such clays can be used in the raw sate as originally mined or initially subjected to calcination, acid treatment or chemical modification. Binders useful for compositing with the present crystal also include inorganic oxides, notably alumina or silica.

In addition to the foregoing materials, the oxide (e.g, silicophosphoaluminate) crystal can be composited with a porous matrix material such as aluminum phosphate, silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The relative proportions of finely divided crystalline oxide (e.g., silicophosphoaluminate) material and inorganic oxide gel matrix vary widely, with the crystal content ranging from about 1 to about 90 percent by weight and more usually, particularly when the composite is prepared in the form of beads, in the range of about 2 to about 80 weight percent of the composite.

The crystalline materials of the present invention are readily convertible to catalytically active material for a variety of organic, e.g. hydrocarbon, compound conversion processes. Such conversion processes include, as non-limiting examples, cracking hydrocarbons with reaction conditions including a temperature of from about 300° C. to about 700° C., a pressure of from about 0.1 atmosphere (bar) to about 30 atmospheres and a weight hourly space velocity of from about 0.1 $hr^{-1}$ to about 20 $hr^{-1}$; dehydrogenating hydrocarbon compounds with reaction conditions including a temperature of from about 300° C. to about 700° C., a pressure of from about 0.1 atmosphere to about 10 atmospheres and a weight hourly space velocity of from about 0.1 to about 20; converting paraffins to aromatics with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting olefins to aromatics, e.g. benzene, toluene and xylenes, with reaction conditions including a temperature of from about 100° C. to about 700° C., a pressure of from about 0.1 atmosphere to about 60 atmospheres, a weight hourly space velocity of from about 0.5 to about 400 and a hydrogen/hydrcarbon mole ratio of from about 0 to about 20; converting alcohols, e.g. methanol, or ethers, e.g. dimethylether, or mixtures thereof to hydrocarbons including aromatics with reaction conditions including a temperature of from about 275° C. to about 600° C., a pressure of from about 0.5 atmosphere to about 50 atmospheres and a liquid hourly space velocity of from about 0.5 to about 100; isomerizing xylene feedstock components with reaction conditions including a temperature of from about 230° C. to about 510° C., a pressure of from about 3 atmospheres to about 35 atmospheres, a weight hourly space velocity of from about 0.1 to about 200 and a hydrogen/hydrocarbon mole ratio of from about 0 to about 100; disproportionating toluene with reaction conditions including a temperature of from about 200° C. to about 760° C., a pressure of from about atmospheric to about 60 atmospheres and a weight hourly space velocity of from about 0.08 to about 20; alkylating aromatic hydrocarbons, e.g. benzene and alkylbenzenes, in the presence of an alkylating agent, e.g. olefins, formaldehyde, alkyl halides and alcohols, with reaction conditions including a temperature of from about 340° C. to about 500° C., a pressure of from about atmospheric to about 200 atmospheres, a weight hourly space velocity of from about 2 to about 2000 and an aromatic hydrocarbon/alkylating agent mole ratio of from about 1/1 to about 20/1; and transalkylating aromatic hydrocarbons in the presence of polyalkylaromatic hydrocarbons with reaction conditions including a temperature of from about 340° C. to about 500° C., a pressure of from about atmospheric to about 200 atmospheres, a weight hourly space velocity of from about 10 to about 1000 and an aromatic hydrocarbon/polyalkylaromatic hydrocarbon mole ratio of from about 1/1 to about 16/1.

In general, therefore, catalytic conversion conditions over a catalyst comprising the oxide (e.g., silicophosphoaluminate) in active form include a temperature of from about 100° C. to about 760° C., a pressure of from about 0.1 atmosphere (bar) to about 200 atmospheres (bar), a weight hourly space velocity of from about 0.08 $hr^{-1}$ to about 2000 $hr^{-1}$ and a hydrogen/organic, e.g. hydrocarbon, compound of from 0 to about 100.

In order to more fully illustrate the nature of the invention and the manner of practicing same, the following examples are presented.

When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1 (Rate Constant=0.016 $sec^{-1}$). In the case of zeolite HZSM-5, only 174 ppm of tetrahedrally coordinated $Al_2O_3$ are required to provide an Alpha Value of 1. The Alpha Test is described in U.S. Pat. No. 3,3543,078 and in *The Journal of Catalysis*, Vol. IV, pp. 522–529 (Aug. 1965), each incorporated herein by reference as to that description.

For the purposes of the present specification and claims which follow, ion-exchange capacity is determined by titrating with a solution of sulfamic acid the gaseous ammonia evolved during the temperature programmed decompositon of the ammonium-form of the oxide (e.g., silicophosphoaluminate). The method is described in *Thermochimica Acta*, Vol. III, pp. 113–124, 1971 by G. T. Kerr and A. W. Chester, incorporated herein by reference as to that description. The oxides of the present invention may have an ion exchange capacity of at least about 0.002 or even at least 0.35 meq/g.

Examples 1–8 which follow relate to the preparation of a silicophoaluminate material designated as MCM-2 from an aluminum phosphate material starting material. These Examples 1–8 also demonstrate distinctions in ion exchange capacity and catalytic activity between certain silicophosphoaluminates and aluminum phosphates.

EXAMPLE 1

A synthesis reaction mixture was prepared which contained 138.3 g of $H_3PO_4$ (85%), 357.6 g of $H_2O$, 82.5 g of Catapal alumina, and 91.2 g of triethylamine. After stirring until the suspension was homogeneous, the mixture was poured into a 1 l steel autoclave and maintained under autogeneous pressure at 200° C. for 24 h. The product was filtered, washed, and dried at 80° C. The product crystals were analyzed to contain 48.9% Al, 51.1% P, and less than 0.03% Si, percentages atomic. A sample of the as-synthesized product was then submitted for X-ray analysis and found to be a crystalline material exhibiting the diffraction lines shown in Table 1.

TABLE 1

| D | 2TH | I/IAX |
|---|---|---|
| 11.7535 | 7.515 | 95.99 |
| 6.8016 | 13.005 | 16.08 |
| 5.8886 | 15.033 | 28.26 |
| 4.4534 | 19.921 | 60.53 |
| 4.2109 | 21.080 | 71.59 |
| 3.9417 | 22.538 | 100.00 |
| 3.5870 | 24.800 | 5.00 |
| 3.4042 | 26.155 | 28.27 |
| 3.0617 | 29.142 | 19.01 |
| 2.9523 | 30.248 | 18.94 |
| 2.6520 | 33.771 | 6.87 |
| 2.5750 | 34.810 | 15.00 |

EXAMPLE 2

The synthesis of Example 1 was repeated resulting in a material showing the characteristic diffraction lines of Table 1 and having the composition 47.95% Al, 51.70% P, and 0.35% Si, percentages atomic.

EXAMPLE 3

A quantity of the crystalline aluminum phosphate of Example 2 was calcined at 450° C. in nitrogen for 4 h and contacted twice with a solution of 1M $NH_4Cl$ at pH=7 for 3 h at 80° C. The product was then evaluated for cationic exchange properties by the titration of gaseous ammonia released during heating from 25° to 600° C. The results of this test showed that no ammonia was released above 250° C., indicating the of cationic exchange sites.

EXAMPLE 4

The final product of Example 3 was submitted to the Alpha Test. Its Alpha Value was less than 0.1.

EXAMPLE 5

A two-phase synthesis reaction mixture was prepared with the organic phase comprised of 60 g 1-hexanol and 10 g $Si(OC_2H_5)_4$, and the aqueous phase comprised of 71 g $H_2O$, 24 g of the product of Example 1 calcined at 450° C. in nitrogen for 4 h, and 37 g of tetraethylammonium hydroxide (40%). After stirring until the mixture appeared homogeneous, the mixture was transferred to a 0.3 l steel autoclave and heated to and maintained at 180° C. for 7 days. The starting and final pH was between 6 and 8. The crystalline product was separated from the reaction mixture by filtration, water washed, and then dried at 80° C. The product crystals were analyzed to contain 41.1% Al, 42.8% P, and 16.1% Si, percentages atomic. The Al/P ratio was 0.96. A sample of the as-synthesized product silicophosphoaluminate was then submitted for X-ray analysis and found to be a crystalline structure exhibiting the diffraction lines shown in Table 2 which are characteristic for MCM-2.

TABLE 2

| D | 2TH | I/IMAX |
|---|---|---|
| 9.2777 | 9.525 | 100.00 |
| 6.8832 | 12.851 | 17.26 |
| 6.2774 | 14.097 | 15.85 |
| 5.5276 | 16.021 | 80.96 |
| 4.9185 | 18.020 | 15.09 |
| 4.6701 | 18.987 | 2.66 |
| 4.3119 | 20.581 | 98.58 |
| 3.9922 | 22.249 | 4.58 |
| 3.8475 | 23.098 | 4.35 |
| 3.5163 | 25.308 | 19.04 |
| 3.4447 | 25.843 | 19.47 |

TABLE 2-continued

| D | 2TH | I/IMAX |
|---|-----|--------|
| 3.0224 | 29.530 | 2.98 |
| 2.9248 | 30.539 | 35.79 |
| 2.8587 | 31.264 | 35.38 |
| 2.6051 | 34.396 | 6.06 |

EXAMPLE 6

The synthesis of Example 5 was repeated using the calcined product of Example 2 as a source of aluminum and phosphorus. The crystalline product was separated from the crystallization mixture by filtration, water washed, and dried at 80° C. The product crystals were analyzed to contain 44.9% Al, 41.6% P, and 13.5% Si, percentages atomic. The Al/P ratio was 1.08. A sample of the as-synthesized product silicophosphoaluminate was then submitted for X-ray analysis and found to be a crystalline structure exhibiting the diffraction lines shown in Table 3 which are characteristic for MCM-2.

TABLE 3

| D | 2TH | I/IMAX |
|---|-----|--------|
| 9.2698 | 9.533 | 100.00 |
| 6.8803 | 12.856 | 15.13 |
| 6.2784 | 14.094 | 14.22 |
| 5.5226 | 16.035 | 77.00 |
| 4.9233 | 18.002 | 12.78 |
| 4.6787 | 18.952 | 5.80 |
| 4.3088 | 20.596 | 96.57 |
| 3.9959 | 22.228 | 5.61 |
| 3.8416 | 23.133 | 4.54 |
| 3.5131 | 25.331 | 29.89 |
| 3.4435 | 25.852 | 21.11 |
| 3.3408 | 26.661 | 15.04 |
| 3.1505 | 28.304 | 6.42 |
| 3.0239 | 29.515 | 4.06 |
| 2.9234 | 30.555 | 39.38 |
| 2.8062 | 31.247 | 38.68 |
| 2.6071 | 34.369 | 6.26 |

EXAMPLE 7

A quantity of the crystalline product of Example 6 was calcined at 450° C. in nitrogen for 4 h and contacted twice with a solution of 1 M NH₄Cl at pH=7 for 3 h at 80° C. The product was then evaluated for cationic exchange properties by the titration of gaseous ammonia released during heating from 25 to 600° C. The results show the release of two types of ammonia. Low temperature ammonia released up to 250° C. amounted to 1.45 meg/g whereas high temperature ammonia, corresponding to cationic sites, was 1.14 meg/g. The maximum rate of desorption for the high temperature ammonia was observed at 375° C.

EXAMPLE 8

The final product of Example 7 was submitted to the Alpha Test. Its Alpha Value was 4.8, indicating a 48 fold or even higher increase in catalytic activity relative to the product material of Example 2.

The following Examples 9–24 demonstrate further preparations and properties of various silicophosphoaluminates.

EXAMPLE 9

A two-phase synthesis reaction mixture was prepared with the organic phase compresed of 60 grams 1-hexanol and 10 grams $Si(OC_2H_5)_4$, and the aqueous phase comprised of 13.7 grams $Al_2O_3$, 23.1 grams $H_3PO_4$ (85%), 84 grams of 25% tetrapropylammonium hydroxide (TPAOH) and 30 grams $H_2O$. The reaction mixture as a whole had a composition including 9.3% Si, 38.8% P and 51.9% Al, the percentages atomic. The directing agent was the tetrapropylammonium hydroxide.

The reaction mixture was heated at 50° C. per hour to 150° C. and maintained at that temperature for 65 hours until crystals of silicophosphoaluminate formed. The starting pH was between 5 and 7.

The crystalline product was separated from the reaction mixture by filtration, water washed and then dried at 80° C. The product crystals were analyzed to contain 15.7% Si, 34.8% P and 49.5% Al, percentages atomic. A sample of the as synthesized silicophosphoaluminate was then submitted for X-ray analysis and found to be a crystalline structure exhibiting the diffraction lines shown in Table 4.

TABLE 4

| Interplanar d-Spacing (A) | Observed 2 × Theta | Relative Intensity, I/I$_o$ |
|---|---|---|
| 9.6677 | 9.140 | 29.97 |
| 6.8569 | 12.900 | 100.00 |
| 6.4870 | 13.639 | 77.56 |
| 5.6000 | 15.812 | 5.00 |
| 4.8729 | 18.190 | 51.07 |
| 4.8414 | 18.310 | 50.26 |
| 4.2482 | 20.893 | 85.10 |
| 3.9700 | 22.375 | 5.00 |
| 3.6099 | 24.641 | 9.67 |
| 3.4401 | 25.877 | 6.62 |
| 3.3900 | 26.267 | 41.66 |
| 3.0597 | 29.162 | 77.25 |
| 2.9312 | 30.471 | 15.08 |
| 2.8927 | 30.886 | 16.69 |
| 2.7777 | 32.199 | 10.96 |
| 2.6781 | 33.432 | 41.21 |

EXAMPLE 10

A quantity of the crystalline silicophosphoaluminate of Example 9 was calcined at 450° C. in nitrogen for 4 hours and then X-ray analyzed. The results are presented in Table 5.

TABLE 5

| Interplanar d-Spacing (A) | Observed 2 × Theta | Relative Intensity, I/I$_o$ |
|---|---|---|
| 6.8339 | 12.944 | 94.83 |
| 4.8477 | 18.286 | 11.21 |
| 4.7900 | 18.507 | 10.00 |
| 4.5300 | 19.579 | 8.00 |
| 4.2731 | 20.770 | 100.00 |
| 4.1441 | 21.424 | 43.10 |
| 3.6246 | 24.539 | 9.98 |
| 3.5438 | 25.108 | 1.54 |
| 3.4200 | 26.032 | 10.00 |
| 3.2900 | 27.079 | 5.00 |
| 3.0823 | 28.944 | 11.86 |
| 3.0427 | 29.329 | 13.57 |
| 2.6961 | 33.202 | 2.87 |

EXAMPLE 11

A two-phase synthesis reaction mixture was prepared with the organic phase comprised of 60 grams 1-hexanol and 10 grams $Si(OC_2H_5)_4$, and the aqueous phase comprised of 23.1 grams $H_3PO_4$(85%), 10 grams $Al_2O_3$, 84 grams TPAOH (25%) and 30 grams $H_2O$. The reaction mixture as a whole had a composition including 10.8% Si, 45.0% P and 44.2% Al, the percentages atomic. The directing agent was the tetrapropylammonium hydroxide.

The reaction mixture was heated at 50° C. per hour to 150° C. and maintained at that temperature for 168 hours until crystals of silicophosphoaluminate formed. The starting pH was between 5 and 7.

The crystalline product was separated from the reaction mixture by filtration, water washed and then dried at 80° C. The product crystals were analyzed to contain 17.5% Si, 37.2% P and 45.4% Al, percentages atomic, and to be large in size. A sample of the as synthesized silicophosphoaluminate was then submitted for X-ray analysis and found to be a crystalline molecular sieve of chabazite type exhibiting the diffraction lines shown in Table 6.

TABLE 6

| Interplanar d-Spacing (A) | Observed 2 × Theta | Relative Intensity, $I/I_o$ |
|---|---|---|
| 9.2412 | 9.563 | 99.21 |
| 6.8600 | 12.894 | 24.93 |
| 6.4868 | 13.640 | 7.48 |
| 6.2515 | 14.155 | 14.65 |
| 5.5144 | 16.059 | 72.90 |
| 4.8868 | 18.138 | 21.38 |
| 4.8257 | 18.370 | 11.67 |
| 4.3030 | 20.624 | 100.00 |
| 4.2584 | 20.843 | 23.57 |
| 4.0000 | 22.205 | 5.00 |
| 3.8400 | 23.142 | 5.00 |
| 3.5075 | 25.373 | 21.42 |
| 3.4376 | 25.897 | 22.89 |
| 3.3947 | 26.230 | 7.27 |
| 3.1239 | 28.550 | 1.77 |
| 3.0495 | 29.262 | 14.07 |
| 3.0160 | 29.594 | 5.90 |
| 2.9190 | 30.601 | 33.97 |
| 2.8492 | 31.370 | 25.06 |

EXAMPLE 12

The synthesis of Example 11 was repeated except that the aqueous phase contained 17.0 grams $Al_2O_3$. The resulting product crystalline silicophosphoaluminate was of small crystal size with 13.2% Si, 36.3% P and 50.5% Al, percentages atomic.

EXAMPLE 13

A quantity of the crystalline silicophosphoaluminate of Example 11 was calcined at 450° C. in nitrogen for 4 hours and then X-ray analyzed. The results are presented in Table 7.

TABLE 7

| Interplanar d-Spacing (A) | Observed 2 × Theta | Relative Intensity, $I/I_o$ |
|---|---|---|
| 9.2476 | 9.556 | 100.00 |
| 6.8414 | 12.929 | 23.34 |
| 6.2800 | 14.090 | 2.00 |
| 5.5050 | 16.087 | 16.61 |
| 4.9465 | 17.918 | 5.05 |
| 4.6200 | 19.194 | 2.00 |
| 4.2923 | 20.676 | 35.99 |
| 3.8415 | 23.134 | 4.72 |
| 3.5423 | 25.119 | 6.97 |
| 3.4266 | 25.982 | 7.73 |
| 3.2100 | 27.768 | 2.00 |
| 3.1600 | 28.216 | 2.00 |
| 2.9086 | 30.174 | 15.30 |
| 2.8621 | 31.226 | 8.93 |

EXAMPLE 14

A two-phase synthesis reaction mixture was prepared with the organic phase comprised of 60 grams 1-hexanol and 10 grams $Si(OC_2H_5)_4$, and the aqueous phase comprised of 7 grams $Al_2O_3$, 23.1 grams $H_3PO_4$(85%), 84 grams TPAOH (25%), and 30 grams $H_2O$. The reaction mixture as a whole had a composition including 12.4% Si, 52.0% P and 35.6% Al, the percentages atomic. The directing agent was tetrapropylammonium hydroxide. The starting pH was between 5 and 7.

The reaction mixture was heated at 50° C. per hour to 150° C. and maintained at that temperature for 65 hours until crystals of silicophosphoaluminate formed. The pH at the start of reaction was between 5 and 7.

The crystalline product was separated from the reaction mixture by filtration, water washed and then dried at 80° C. A sample of the as synthesized silicophosphoaluminate was then submitted for X-ray analysis and found to be a crystalline structure exhibiting the diffraction lines shown in Table 8.

TABLE 8

| Interplanar d-Spacing (A) | Observed 2 × Theta | Relative Intensity, $I/I_o$ |
|---|---|---|
| 5.1933 | 17.059 | 43.92 |
| 4.8933 | 18.114 | 15.90 |
| 4.5500 | 19.493 | 1.00 |
| 4.2976 | 20.650 | 100.00 |
| 3.9617 | 22.423 | 23.28 |
| 3.9145 | 22.697 | 63.05 |
| 3.8453 | 23.111 | 14.34 |
| 3.6884 | 24.109 | 28.92 |
| 3.5868 | 24.802 | 49.12 |
| 3.3852 | 26.305 | 4.70 |
| 3.0406 | 29.349 | 20.04 |
| 2.9094 | 30.705 | 12.74 |
| 2.8588 | 31.262 | 14.05 |
| 2.7565 | 32.454 | 12.24 |

EXAMPLE 15

A two phase synthesis reaction mixture was prepared with the organic phase comprised of 60 grams 1-hexanol and 10 grams $Si(OC_2H_5)_4$, and the aqueous phase comprised of 15.8 grams $Al_2O_3$, 42.3 grams $H_3PO_4$ (85%), 84 grams TPAOH (25%) and 30 grams water. The reaction mixture as a whole had a composition including 6.6% Si, 50.6% P and 42.8% Al, the percentages atomic. The directing agent was tetrapropylammonium hydroxide. The reaction mixture was heated at 50° C. per hour to 150° C. and maintained at that temperature for 168 hours until crystals of silicophosphoaluminate formed. The starting pH was between 5 and 7.

The crystalline product was separated from the reaction mixture by filtration, water washed and then dried at 80° C. A sample of the as synthesized silicophosphoaluminate was then submitted for X-ray analysis and found to be a crystalline material exhibiting the diffraction lines shown in Table 9.

TABLE 9

| Interplanar d-Spacing (A) | Observed 2 × Theta | Relative Intensity, $I/I_O$ |
|---|---|---|
| 4.4626 | 19.879 | 13.77 |
| 4.3539 | 20.380 | 36.23 |
| 4.2694 | 20.788 | 100.00 |
| 4.0690 | 21.825 | 16.32 |
| 3.9834 | 22.299 | 3.43 |
| 3.7400 | 23.770 | 5.00 |
| 3.6516 | 24.355 | 31.12 |
| 3.3698 | 26.428 | 62.10 |
| 3.0467 | 29.289 | 7.84 |
| 2.9447 | 30.328 | 6.71 |

EXAMPLE 16

A two-phase synthesis reaction mixture was prepared with the organic phase comprised of 60 grams 1-hexanol and 10 grams $Si(OC_2H_5)_4$, and the aqueous phase comprised of 13.8 grams $Al_2O_3$, 23.1 grams $H_3PO_4$ (85%), 4.0 grams NaOH, 26.0 g TPABr and 100 g $H_2O$. The reaction mixture as a whole had a composition including 9.3% Si, 38.6% P and 52.1% Al, the percentages atomic. The directing agent was the tetrapropylammonium bromide. The starting pH was between 5 and The reaction mixture was heated at 50° C. per hour to 150° C. and maintained at that temperature for 168 hours until crystals of silicophoaluminate formed.

The crystalline product was separated from the reaction mixture by filtration, water washed and then dried at 80° C. The product crystals were analyzed to contain 9.6% Si, 45.9% P and 44.5% Al, percentages atomic. A sample of the as synthesized silicophosphoaluminate was then submitted for X-ray analysis and found to be a crystalline material exhibiting the diffraction lines shown in Table 10.

TABLE 10

| Interplanar d-Spacing (A) | Observed 2 × Theta | Relative Intensity, $I/I_o$ |
|---|---|---|
| 8.5984 | 10.279 | 100.00 |
| 6.7810 | 13.045 | 3.05 |
| 4.7545 | 18.647 | 4.65 |
| 4.6389 | 19.116 | 6.49 |
| 4.5429 | 19.524 | 1.58 |
| 4.4200 | 20.072 | 2.00 |
| 4.3500 | 20.398 | 3.00 |
| 4.2206 | 21.031 | 2.60 |
| 4.1134 | 21.586 | 2.37 |
| 3.8541 | 23.058 | 1.60 |
| 3.7092 | 23.971 | 6.80 |
| 3.6724 | 24.215 | 3.65 |
| 3.4981 | 25.441 | 1.08 |
| 3.3886 | 26.278 | 3.73 |
| 3.3331 | 26.723 | 0.48 |
| 3.2150 | 27.724 | 4.51 |
| 3.1615 | 28.202 | 2.87 |
| 3.0206 | 29.548 | 2.28 |
| 2.9090 | 30.709 | 1.12 |
| 2.8887 | 30.930 | 1.63 |
| 2.7450 | 32.594 | 1.07 |
| 2.7005 | 33.146 | 2.00 |
| 2.6774 | 33.441 | 0.84 |
| 2.6472 | 33.833 | 0.73 |
| 2.5890 | 34.618 | 1.34 |
| 2.5760 | 34.797 | 1.30 |

EXAMPLE 17

A sample of the calcined product crystalline silicophosphoaluminate of Example 13 was evaluated for sorption properties to confirm its molecular sieve nature. The results, in wt.%, were as follows:

| | |
|---|---|
| Water (60° C.) | 10.3 |
| n-Hexane (90° C.) | 9.3 |
| p-Xylene (90° C.) | 2.7 |
| 2-Methyl-Pentane (90° C.) | 1.1 |
| Cyclohexane (90° C.) | 0.8 |
| o-Xylene (120° C.) | 0.9 |

EXAMPLE 18

A quantity of crystalline silicophosphoaluminate product of Example 11 was evaluated for sorption properties both before and after thermal treatment at 900° C. The sorption properties were proven to be unaltered by such thermal treatment indicating exceptional thermal stability of the crystalline molecular sieve silicophosphoaluminate of Example 11.

EXAMPLE 19

The Example 11 and 12 products were evaluated for acidic properties by the titration of gaseous ammonia released during heating of the ammonium form from 25 to 600° C. Results of this test indicated a maximum rate of ammonia evolution at 360° C. and an ion exchange capacity for each product of 0.7–0.8 meq/gram.

EXAMPLE 20

The Example 11 product was tested in the Alpha Test after conversion to the hydrogen-form by heating the ammonium form to 450°–550° C. in nitrogen. Its Alpha Value proved to be 8.6. This same product proved to have methanol conversion activity at 350° C., toluene alkylation with methanol activity at 538° C. and with ethylene at between 450° C. and 500° C.

EXAMPLES 21-24

Four separate two phase reaction mixtures were prepared for synthesis of four different silicophosphoaluminte crystalline materials. The reaction mixture compositions and reaction conditions are listed in Table 11, hereinafter. The four products obtained each had tetrahedrally coordinated silicon, phosphorus and aluminum in compositions indicated in Table 11.

X-ray diffraction analysis of each silicophosphoaluminate product is listed in the hereinafter presented Tables 12, 13, 14 and 15, for products of Examples 21, 22, 23 and 24, respectively.

The product material of Examples 21, 22 and 23 were evaluated for Constraint Index (defined in U.S. Pat. No. 4,385,195, incorporated in its entirety herein by reference) and Alpha Value. The results are listed in Table 16.

TABLE 11

| Product of Example | 21 | 22 | 23 | 24 |
|---|---|---|---|---|
| Synthesis mixture composition (g) | | | | |
| $H_3PO_4$ (85%) | 23.1 | 23.1 | 23.1 | 23.1 |
| $H_2O$ | 71.0 | 59.6 | 71.0 | 70.0 |
| $Al_2O_3$ | 10.0 | 13.7 | 10.0 | 10.0 |
| $Si(OC_2H_5)_4$ | 10.0 | 10.0 | 10.0 | 10.0 |
| 1-Hexanol | 60.0 | 60.0 | 60.0 | 60.0 |
| Organic base | | | | |
| TMAOH (25%) | — | — | — | 31.0 |
| TEAOH (40%) | 37.0 | — | 37.0 | — |
| di-n-Propylamine | — | 10.1 | — | — |
| Inorganic base (ml; 5 × $10^{-2}$ M) | | | | |
| KOH | — | — | 2.0 | — |
| CsOH | 0.04 | — | 2.0 | — |
| Conditions | | | | |
| Nucleation time, hours | 24 | 24 | 24 | 24 |
| Nucleation temp., °C. | 130 | 130 | 130 | 130 |
| Crystal. time, hours | 144 | 24 | 144 | 144 |
| Crystal. temp., °C. | 180 | 200 | 180 | 180 |
| Spinning rate, rpm | 800 | 800 | 800 | 800 |
| Starting pH | 6.5 | 5.5 | 6.5 | 5.5 |
| Ending pH | 6.5 | 9 | 6.0 | 7 |
| Product Composition (T-atom fraction) | | | | |
| Si | 19.7 | 12.7 | 19.8 | 15.3 |
| P | 39.9 | 41.7 | 39.6 | 46.3 |
| Al | 40.4 | 45.6 | 40.7 | 38.4 |
| Product Oxide Composition (wt. %, as-synth.) | | | | |

TABLE 11-continued

| Product of Example | 21 | 22 | 23 | 24 |
|---|---|---|---|---|
| SiO$_2$ | 15.83 | 10.45 | 14.33 | 11.49 |
| P$_2$O$_5$ | 37.85 | 41.06 | 33.90 | 41.22 |
| Al$_2$O$_3$ | 27.63 | 32.29 | 25.10 | 24.60 |
| N-content (wt. %) | 1.2 | 1.3 | 1.2 | 1.3 |
| C-content (wt. %) | 5.46 | 5.95 | 6.32 | 8.13 |
| Ash content (wt. %) | 85.9 | 87.2 | 85.2 | 87.6 |
| Ion exchange cap. (meq per ash) | 0.56 | 1.16 | 0.80 | 0.29 |

TABLE 12

| Interplanar d-Spacing (A) | Observed 2 × Theta | Relative Intensity I/I$_o$ |
|---|---|---|
| 11.81457 | 7.476 | 93.1 |
| 6.83915 | 12.934 | 12.5 |
| 5.92518 | 14.939 | 32.4 |
| 4.48008 | 19.801 | 81.1 |
| 4.20412 | 21.115 | 78.7 |
| 3.95564 | 22.458 | 100.0 |
| 3.66765 | 24.847 | 5.0 |
| 3.42339 | 26.006 | 42.3 |
| 3.06571 | 29.104 | 18.8 |
| 2.96477 | 30.118 | 22.1 |
| 2.65646 | 33.712 | 6.8 |
| 2.58880 | 34.620 | 22.3 |

TABLE 13

| Interplanar d-Spacing (A) | Observed 2 × Theta | Relative Intensiy, I/I$_o$ |
|---|---|---|
| 10.85413 | 8.139 | 18.2 |
| 9.32129 | 9.480 | 29.9 |
| 6.69511 | 13.213 | 11.9 |
| 5.63770 | 15.706 | 25.9 |
| 4.36818 | 20.313 | 85.7 |
| 4.20785 | 21.096 | 100.0 |
| 4.00432 | 22.181 | 60.3 |
| 3.93218 | 22.594 | 64.8 |
| 3.90051 | 22.780 | 71.1 |
| 3.82889 | 23.211 | 76.6 |
| 3.10868 | 28.693 | 8.9 |
| 3.00339 | 29.721 | 10.4 |
| 2.71879 | 32.917 | 11.9 |

TABLE 14

| Interplanar d-Spacing (A) | Observed 2 × Theta | Relative Intensity, I/I$_o$ |
|---|---|---|
| 9.2412 | 9.563 | 99.21 |
| 6.8600 | 12.894 | 24.93 |
| 6.4868 | 13.640 | 7.48 |
| 6.2515 | 14.155 | 14.65 |
| 5.5144 | 16.059 | 72.90 |
| 4.8868 | 18.138 | 21.38 |
| 4.8257 | 18.370 | 11.67 |
| 4.3030 | 20.624 | 100.00 |
| 4.2584 | 20.843 | 23.57 |
| 4.0000 | 22.205 | 5.00 |
| 3.8400 | 23.142 | 5.00 |
| 3.5075 | 25.373 | 21.42 |
| 3.4376 | 25.897 | 22.89 |
| 3.3947 | 26.230 | 7.27 |
| 3.1239 | 28.550 | 1.77 |
| 3.0495 | 29.262 | 14.07 |
| 3.0160 | 29.594 | 5.90 |
| 2.9190 | 30.601 | 33.97 |
| 2.8492 | 31.370 | 25.06 |

TABLE 15

| Interplanar d-Sacing (A) | Observed 2 × Theta | Relative Intensity, I/I$_o$ |
|---|---|---|
| 6.3139 | 14.015 | 68.10 |
| 4.4698 | 19.847 | 48.03 |
| 3.6517 | 24.355 | 100.00 |
| 3.1578 | 28.237 | 15.37 |
| 2.8291 | 31.599 | 12.03 |
| 2.5869 | 34.647 | 13.37 |
| 3.9910 | 22.256 | 5.40 |

TABLE 16

| Product of Example | 13 | 14 | 15 |
|---|---|---|---|
| Constraint Index | 0.5-0.7 | 1.0 | 100 |
| Alpha Value | — | 3.5 | — |

COMPARATIVE EXAMPLE

For comparison purposes, an aqueous only synthesis reaction mixture (single phase) was prepared by adding 3 grams silica (Hisil, composed of precipitated hydrated SiO$_2$ containing about 6 wt.% free H$_2$O and about 4.5 wt.% bound H$_2$O of hydration and having a particle size of about 0.02 micron) to a solution of 23.1 grams H$_3$PO$_4$ (85%) and 30 grams water containing 84 grams TPAOH (25%) and 10 grams Al$_2$O$_3$. The directing agent was tetrapropylammonium hydroxide. The reaction mixture was heated at 50° C. per hour to 150° C. and maintained at that temperature for 120 hours.

The product was separated from the reaction mixture by filtration, water washed, and dried at 80° C. X-ray diffraction analysis indicated that the solid product was a mixture of poorly crystallized aluminum phosphate material identified in U.S. Pat. No. 4,310,440 and amorphous silica-alumina. Microprobe analyses of the product crystals failed to indicate any silicophosphoaluminate.

The following Examples 25-39 demonstrate preparations and properties of non-silicophosphoaluminate forms of the oxides of the present invention.

EXAMPLE 25

A two-phase synthesis reaction mixture was prepared with the organic phase comprised of 11 g of Ti-(OC$_2$H$_5$)$_4$ and 60 g 1-hexanol, and the aqueous phase comprised of 23.1 g H$_3$PO$_4$ (85%), 10 g Al$_2$O$_3$, 37 g TEAOH (40%) and 71 g of water. The reaction mixture as a whole had a composition including 10.8% Ti, 45% P and 44.2 Al, the percentages atomic. The directing agent in the organic phase was tetraethylammonium hydroxide.

The reaction mixture was heated at 50° C. per hour to 130° C. and maintained at that temperature for 24 hours. It was then heated to 180° C. and maintained there for 144 hours. During this time, mixing was obtained by spinning at 800 rpm. Initial and final pH was 7.

The crystalline product was separated from the reaction mixture by filtration, water washed and then dried at 80° C. The product crystalline titanophosphoaluminate had a composition including 0.8% Ti, 50.0% P, and 49.2% Al, the percentages atomic. A sample of the as synthesized titanophosphoaluminate was then submitted for X-ray analysis. It was found to be a crystalline molecular sieve exhibiting the characteristic diffraction lines shown in Table 17.

TABLE 17

| Interplanar d-Spacings (A) | Observed 2 × Theta | Relative Intensities I/I$_o$ |
|---|---|---|
| 11.7888 | 7.493 | 84.33 |
| 6.8098 | 12.990 | 12.26 |
| 5.8972 | 15.011 | 32.94 |
| 4.4601 | 19.890 | 72.79 |
| 4.2233 | 21.018 | 81.28 |
| 3.9476 | 22.504 | 100.00 |
| 3.5901 | 24.779 | 6.46 |
| 3.4113 | 26.100 | 22.94 |
| 3.0664 | 29.097 | 17.82 |
| 2.9540 | 30.231 | 24.44 |
| 2.6548 | 33.734 | 8.08 |
| 2.5788 | 34.759 | 21.55 |

EXAMPLE 26

A quantity of the crystalline titanophosphoaluminate of Example 25 was calcined at 450° C. in air for 4 hours and then X-ray analyzed. The results are presented in Table 18.

TABLE 18

| Interplanar d-Spacings (A) | Observed 2 × Theta | Relative Intensities I/I$_o$ |
|---|---|---|
| 11.9513 | 7.391 | 100.00 |
| 6.8851 | 12.847 | 20.38 |
| 5.9644 | 14.841 | 8.06 |
| 4.5079 | 19.677 | 33.90 |
| 4.1992 | 21.140 | 41.54 |
| 3.9702 | 22.374 | 58.93 |
| 3.5845 | 24.818 | 2.48 |
| 3.4427 | 25.858 | 20.72 |
| 3.0772 | 28.993 | 12.35 |
| 2.9839 | 29.920 | 13.41 |
| 2.6639 | 33.615 | 3.96 |
| 2.6038 | 31.414 | 12.27 |

EXAMPLE 27

A quantity of the crystalline titanophosphoaluminate of Example 25 was calcined as described in Example 26 and ammonium-exchanged using an aqueous solution of 1M NH$_4$NO$_3$. The ion-exchange capacity measured from the evolution of ammonia was determined to be 0.361 meq/g.

EXAMPLE 28

The product of Example 27 was examined by the Alpha Test and found to have an Alpha Value of 0.5

EXAMPLE 29

A sample of the calcined product titanophosphoaluminate of Example 27 was evaluated for sorption properties to confirm its molecular sieve nature. The results in weight percent were as follows:
hexane (90° C.): 3.35%
water (60° C.): 0.84%

EXAMPLE 30

A two-phase synthesis reaction mixture was prepared with the organic phase comprised of 11 g Ti(OC$_2$H$_5$)$_4$ and 60 g 1-hexanol, and the aqueous phase comprised of 23.1 g H$_3$PO$_4$ (85%), 10 g Al$_2$O$_3$, 31 g TMAOH (25%) and 70 g of water. The reaction mixture as a whole had a composition including 10.8% Ti, 45% P and 44.2% Al, the percentages atomic. The directing agent was tetramethylammonium hydroxide.

The reaction mixture was heated at 50° C. per hour to 130° C. and maintained at that temperature for 24 hours. It was then heated to 180° C. and maintained there for 144 hours. During this time, mixing was obtained by spinning at 800 rpm. The initial and final pH was 7.5.

The crystalline product was separated from the reaction mixture by filtration, water washed and then dried at 80° C. The product crystalline titanophosphoaluminate had a composition including 12.3% Ti, 50.2% P, and 37.5% Al, the percentages atomic. A sample of the as synthesized titanophosphoaluminate was then submitted for X-ray analysis. It was found to be a crystalline molecular sieve exhibiting the diffraction lines shown in Table 19.

TABLE 19

| Interplanar d-Spacings (A) | Observed 2 × Theta | Relative Intensities I/I$_o$ |
|---|---|---|
| 6.3130 | 14.017 | 50.11 |
| 4.4639 | 19.873 | 40.22 |
| 3.9923 | 22.249 | 9.21 |
| 3.6437 | 24.409 | 100.00 |
| 3.3697 | 26.428 | 27.06 |
| 3.1570 | 28.244 | 18.28 |
| 2.8253 | 31.642 | 12.71 |
| 2.5792 | 34.753 | 21.29 |

EXAMPLE 31

A quantity of the crystalline titanophosphoaluminate of Example 30 was calcined at 450° C. in air for 4 hours and then X-ray analyzed. The results are presented in Table 20.

TABLE 20

| Interplanar d-Spacings (A) | Observed 2 × Theta | Relative Intensities I/I$_o$ |
|---|---|---|
| 6.2896 | 14.069 | 88.77 |
| 4.4518 | 19.928 | 36.91 |
| 3.9821 | 22.307 | 6.65 |
| 3.6336 | 24.478 | 100.00 |
| 3.1496 | 28.312 | 24.27 |
| 2.8197 | 31.707 | 17.55 |
| 2.5728 | 34.842 | 21.41 |

EXAMPLE 32

A quantity of the crystalline titanophosphoaluminate of Example 30 was calcined as described in Example 31 and ammonium-exchanged using an aqueous solution of 1M NH$_4$NO$_3$. The ion-exchange capacity measured from the evolution of ammonia was determined to be 0.472 meq/g.

EXAMPLE 33

The synthesis of Example 25 was repeated except that 12 g of Ge (OC$_2$H$_5$)$_4$ replaced the titanium reagent. Initial pH was 6.5 and the final pH was about 7. The resulting product crystalline germanophosphoaluminate had a composition including 0.01% Ge, 49.35% P and 50.64% Al, percentages atomic and showed the X-ray diffraction pattern of Table 21.

EXAMPLE 34

A quantity of the crystalline germanophosphoaluminate of Example 33 was calcined at 450° C. in air for 4 hours and then X-ray analyzed. The results are presented in Table 22.

TABLE 21

| Interplanar d-Spacings (A) | Observed 2 × Theta | Relative Intensities I/I$_o$ |
|---|---|---|
| 11.7908 | 7.491 | 77.43 |

TABLE 21-continued

| Interplanar d-Spacings (A) | Observed 2 × Theta | Relative Intensities $I/I_o$ |
| --- | --- | --- |
| 6.8111 | 12.987 | 11.72 |
| 5.8997 | 15.004 | 32.03 |
| 4.4617 | 19.883 | 73.68 |
| 4.2249 | 21.010 | 77.79 |
| 3.9501 | 22.490 | 100.00 |
| 3.5911 | 24.772 | 6.07 |
| 3.4177 | 26.050 | 52.92 |
| 3.0678 | 29.084 | 18.00 |
| 2.9554 | 30.216 | 24.28 |
| 2.6563 | 33.714 | 7.71 |
| 2.5804 | 34.737 | 21.87 |

TABLE 22

| Interplanar d-Spacings (A) | Observed 2 × Theta | Relative Intensities $I/I_o$ |
| --- | --- | --- |
| 11.6198 | 7.602 | 94.26 |
| 6.7252 | 13.154 | 25.20 |
| 5.8292 | 15.187 | 10.87 |
| 4.4056 | 20.139 | 29.82 |
| 4.0399 | 21.984 | 15.05 |
| 3.9276 | 22.621 | 100.00 |
| 3.6255 | 24.533 | 5.17 |
| 3.3707 | 26.420 | 35.81 |
| 3.0865 | 28.904 | 18.65 |
| 3.0349 | 29.406 | 12.04 |
| 2.9222 | 30.567 | 22.28 |
| 2.6595 | 33.672 | 6.65 |

EXAMPLE 35

A quantity of the crystalline germanophosphoaluminate of Example 33 was calcined as described in Example 33 and ammonium-exchanged using an aqueous solution of 1M NH$_4$NO$_3$. The ion-exchange capacity measured from the evolution of ammonia was determined to be 1.25 meq/g.

EXAMPLE 36

The product of Example 35 was examined by Alpha Test and found to have an Alpha Value of 0.6.

EXAMPLE 37

A sample of the calcined product germanophosphoaluminate of Example 35 was evaluated for sorption properties to confirm its molecular sieve nature. The results in weight percent were as follows:
hexane (90° C.): 2.87%
water (60° C.): 0.59%

EXAMPLE 38

The synthesis of Example 30 was repeated except 12 g Ge(OC$_2$H$_5$)$_4$ replaced the titanium reagent. Initial and final pH was 7.5. The resulting product crystalline germanophosphoaluminate had a composition including 4.4% Ge, 50.0% P and 45.6% Al, percentages atomic and showed the characteristic X-ray diffraction pattern of Table 23.

EXAMPLE 39

A quantity of the crystalline germanophosphoaluminate of Example 38 was calcined at 450° C. in air for 4 hours and then X-ray analyzed. The results are presented in Table 24.

TABLE 23

| Interplanar d-Spacings (A) | Observed 2 × Theta | Relative Intensities $I/I_o$ |
| --- | --- | --- |
| 6.3046 | 14.036 | 48.14 |
| 4.4609 | 19.887 | 43.85 |
| 3.9898 | 22.263 | 7.52 |
| 3.6431 | 24.413 | 100.00 |
| 3.4258 | 25.988 | 68.73 |
| 3.3699 | 26.427 | 10.94 |
| 3.1550 | 28.262 | 17.00 |
| 2.8242 | 31.655 | 15.51 |
| 2.5780 | 34.769 | 22.07 |

TABLE 24

| Interplanar d-Spacings (A) | Observed 2 × Theta | Relative Intensities $I/I_o$ |
| --- | --- | --- |
| 6.3051 | 14.036 | 71.43 |
| 4.4604 | 19.889 | 43.55 |
| 3.9902 | 22.261 | 6.60 |
| 2.6431 | 24.413 | 100.00 |
| 3.4255 | 25.990 | 57.80 |
| 3.1556 | 28.257 | 18.11 |
| 2.8241 | 31.656 | 17.76 |
| 2.5784 | 34.765 | 24.57 |

EXAMPLE 40

A quantity of the crystalline germanophosphoaluminate of Example 37 was calcined as described in Example 39 and ammonium-exchanged using an aqueous solution of 1M NH$_4$NO$_3$. The ion-exchange capacity measured from the evolution of ammonia was determined to be 0.405 meq/g.

What is claimed is:
1. A method for synthesizing a crystalline oxide, which method comprises:
(1) providing a reaction mixture comprising sources of X oxide, Y oxide and Z oxide, wherein X represents one or more elements of valence plus 3 selected from the group consisting of aluminum, iron, chromium, vanadium, molybdenum, arsenic, antimony, manganese, gallium and boron, Y represents one or more elements of valence plus 5 selected from the group consisting of phosphorus, arsenic, antimony and vanadium, Z represents one or more elements of valence plus 4 selected from the group consisting of silicon, germanium and titanium, one of said oxide sources being unstable in water, an organic directing agent D, inorganic cations M and anions N, and a substantially water-immiscible organic solvent for said oxide source unstable in the water, the components of said reaction mixture having the following relationship:

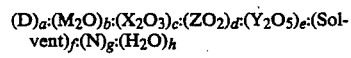

$(D)_a:(M_2O)_b:(X_2O_3)_c:(ZO_2)_d:(Y_2O_5)_e:(Solvent)_f:(N)_g:(H_2O)_h$ wherein a, b, c, d, e, f, g and h are numbers satisfying the following relationships:
a/(c+d+e) is less than 4,
b/(c+d+e) is less than 2,
d/(c+e) is less than 2,
f/(c+d+e) is from 0.1 to 15,
g/(c+d+e) is less than 2, and
h/(c+d+e) is from 3 to 150,
wherein upon initial provision of said reaction mixture said oxide source unstable in the water is dispersed or dissolved in the water-immiscible organic solvent;

(2) heating said reaction mixture at a rate of from 5° C. to 200° C. per hour to a temperature of from 80° C. to 300° C.;

(3) agitating said reaction mixture in a manner sufficient to intimately admix the water-immiscible organic solvent and the water with each other, thereby progressively hydrolyzing the oxide source unstable in water;

(4) maintaining said agitated reaction mixture at a temperature of from 80° C. to 300° C. and a pH of from 2 to 9 until crystals of oxide material are formed; and (5) recovering from said reaction mixture oxide material characterized by a composition, in the anhydrous state, as follows:

$$D'_v M_{x/m}{}^{m+}:(XO_2)_{1-y}{}^-:(YO_2)_{1-x}{}^+:(ZO_2)_{x+y}:N_{y/n}{}^{n-}$$

wherein D' represents the total of organic directing agent D plus organic solvent, v is the number of moles of D', m is the valence of cation M, n is the valence of anion N, and x and y are numbers of from greater than $-1$ to less than $+1$ which satisfy the relationships:

(1) if x is 0, then y is not 0,
(2) if y is 0, then x is not 0,
(3) if the atomic ratio of X/Y is greater than 1, then (x+y) is greater than 0 and y+0.6x is less than 0.4, and
(4) if the atomic ratio of X/Y is less than 1, then (x+y) is greater than 0 and 0.5 is greater than 0.5y+x, said oxide having an ion exchange capacity of at least about 0.002 meq/g.

2. A method according to claim 1 wherein the organic directing agent D is an amine or an onium compound of the formula $$R_4M^+X^- \text{ or } (R_3M^+R'M^+R_3)X_2^-$$

wherein R or R' are alkyl or alkylene of from 1 to 20 carbon atoms, heteroalkyl of from 1 to 20 carbon atoms, aryl, heteroaryl, cycloalkyl of from 3 to 6 carbon atoms, cycloheteroalkyl of from 3 to 6 carbon atoms, or combinations thereof; M is a tetracoordinate element atom selected from nitrogen, phosphorus, arsenic, antimony or bismuth or a heteroatom selected from N, O, S, Se, P or As in an alicyclic, heteroalicyclic or heteroaromatic structure; and X is an anion.

3. A method according to claim 2 wherein the organic directing agent D is selected from $C_1$–$C_3$ alkylamines and onium compounds of the formula $$R_4M^+X^- \text{ or } (R_3M^+R'M^+R_3)X_2^-$$

wherein R is $C_1$ to $C_4$ alkyl, R' is $C_1$ to $C_6$ alkylene, M is nitrogen and X is halide or hydroxide; and wherein the organic solvent is a $C_5$ to $C_{10}$ alcohol.

4. A method according to claim 1 wherein the source of Z oxide is initially present in the water-immiscible organic solvent and wherein the pH of the agitated reaction mixture is maintained between 6 and 9.

5. A method according to claim 1 which comprises the additional step of heating the recovered crystalline oxide material at a temperature of from 300° C. to 1000° C.

6. A method according to claim 1 wherein X is aluminum, Y is phosphorus and the source of X oxide and Y oxide is dissolved or partially dissolved aluminum phosphate.

* * * * *

UNITED STATES PATENT AND TRADEMARK OFFICE
CERTIFICATE OF CORRECTION

PATENT NO. : 4,891,197

DATED : January 2, 1990

INVENTOR(S) : E.G. Derouane et al

It is certified that error appears in the above-identified patent and that said Letters Patent is hereby corrected as shown below:

Col. 9, Table, line 47   "Fe   +3   0.56" should be --Fe   +2   0.56--
Col. 9, Table, line 62   insert --2-- after "+"
Col. 19, line 12         insert --7.-- after "and"
Col. 20, Table 11,
  line 54                move "2.0" to Table Col. 24

Signed and Sealed this

Twenty-ninth Day of January, 1991

Attest:

HARRY F. MANBECK, JR.

Attesting Officer    Commissioner of Patents and Trademarks